United States Patent [19]

Phipps et al.

[11] Patent Number: 5,532,946

[45] Date of Patent: Jul. 2, 1996

[54] CALCULATOR WITH TABLE GENERATION CAPABILITY

[75] Inventors: Ann E. Phipps; David M. Santucci, both of Dallas, Tex.

[73] Assignee: Texas Instruments Incorporated, Dallas, Tex.

[21] Appl. No.: 526,606

[22] Filed: Sep. 11, 1995

Related U.S. Application Data

[63] Continuation of Ser. No. 128,941, Sep. 29, 1993, abandoned.

[51] Int. Cl.$^6$ ............................................. G06F 3/14
[52] U.S. Cl. ................................. 364/710.14; 345/133
[58] Field of Search ......................... 364/710.14, 710.01; 345/133

[56] References Cited

U.S. PATENT DOCUMENTS

| | | | |
|---|---|---|---|
| 4,535,416 | 8/1985 | Kano et al. | 364/710.01 |
| 4,794,553 | 12/1988 | Watanabe et al. | 364/710.01 |
| 4,845,652 | 7/1989 | Bunsen | 364/710.14 |
| 5,210,708 | 5/1993 | Negishi | 364/710.14 |
| 5,245,559 | 9/1993 | Lapeyre | 364/710.14 |
| 5,377,130 | 12/1994 | Frank et al. | 364/710.14 |

*Primary Examiner*—David H. Malzahn
*Attorney, Agent, or Firm*—William E. Hiller; Richard L. Donaldson

[57] ABSTRACT

A digital computer or calculator (10) is equipped with a numerical data table generation capability (36). It provides a user with the ability to specify one or more mathematical functions (32), and the ability to specify how the numerical data in support of the functions are to be displayed (34, 50–56).

18 Claims, 5 Drawing Sheets

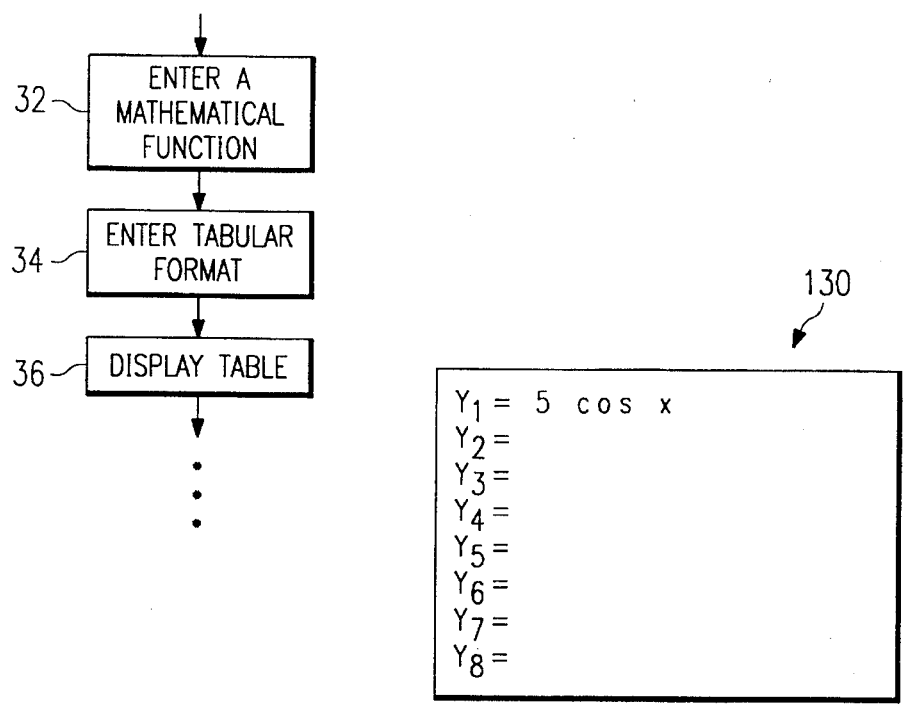
FIG. 2
FIG. 5
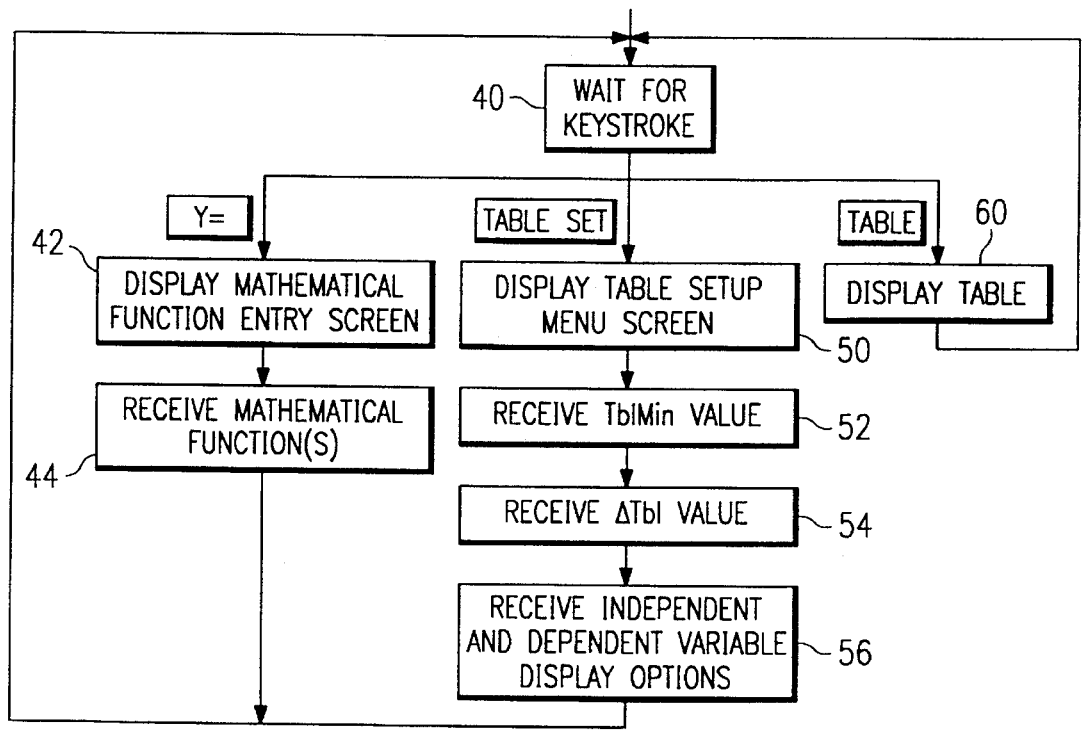
FIG. 3

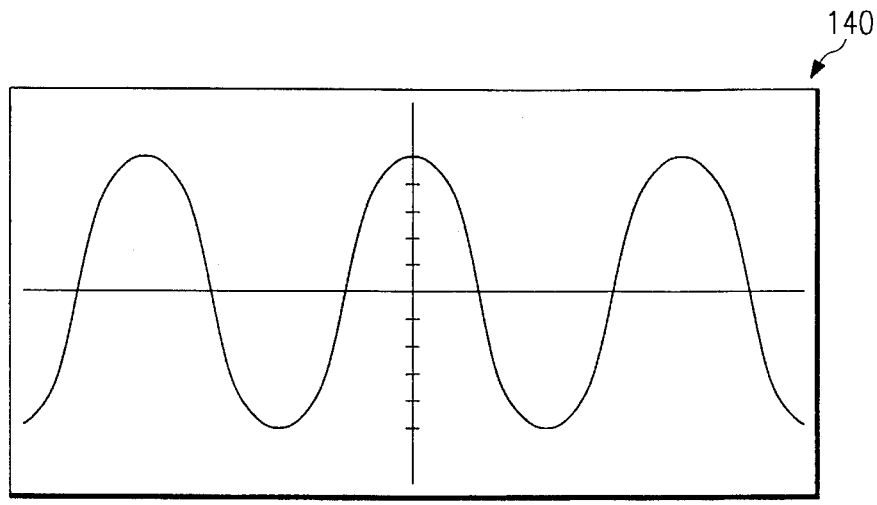
FIG. 6
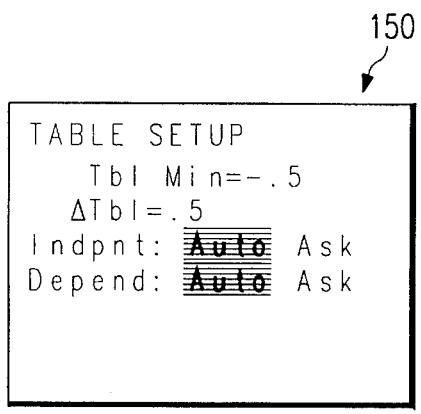
FIG. 7
| X | Y₁ | |
|---|---|---|
| -.5 | 4.3879 | |
| 0 | 5 | |
| .5 | 4.3879 | |
| 1 | 2.7015 | |
| 1.5 | .35369 | |
| 2 | -2.081 | |
| 2.5 | -4.006 | |
| X=-.5 | | |
FIG. 8
| X | Y₁ | |
|---|---|---|
| -.5 | | |
| 0 | | |
| .5 | | |
| 1 | | |
| 1.5 | | |
| 2 | | |
| 2.5 | | |
| Y₁= | | |
FIG. 9

5,532,946

CALCULATOR WITH TABLE GENERATION CAPABILITY

This application is a continuation of application Ser. No. 08/128,941, filed Sep. 29, 1993, now abandoned.

NOTICE (C) Copyright, *M* Texas Instruments Incorporated, 1993. A portion of the Disclosure of this patent document contains material which is subject to copyright protection. The copyright and mask work owner has no objection to facsimile reproduction by anyone of the patent document or the patent disclosure, as it appears in the U.S. Patent and Trademark Office, patent file or records, but otherwise reserves all rights in its copyright and mask work whatsoever.

TECHNICAL FIELD OF THE INVENTION

This invention relates in general to the field of digital computers and calculators. More particularly, the present invention relates to a calculator with table generation capability.

BACKGROUND OF THE INVENTION

Calculators may be equipped with graphics capabilities. These calculators are generally special purpose computers with built-in software for drawing graphs. Upon the specification of a function, the graphics calculator is able to plot the function on a predefined set of axes. Such graphics calculators have been pedagogically employed as effective mathematics teaching tools. Educators can easily and quickly plot a variety of mathematical equations to demonstrate the interrelationship between the mathematical expressions and their corresponding graphs. Abstract mathematical concepts are thus more easily grasped by the students.

However, a serious limitation of graphics calculators heretofore has been their limited ability to provide numerical information in support of the plotted graph. Although numerical information about plotted functions can sometimes be obtained, the procedures to do so are awkward and the information is not displayed in a convenient manner. Without this capability, useful and sometimes vital information about the function, such as zeros, local maxima, and local minima, is not readily available. Accordingly, a need has arisen to provide the capability to supply desirable numerical information in support of the graphics function in a graphics calculator or computer.

SUMMARY OF THE INVENTION

In accordance with the present invention, a calculator is provided which substantially eliminates or reduces disadvantages and problems associated with prior calculators and computers.

In one aspect of the present invention, a digital computer or calculator is equipped with a numerical data table generation capability. It provides a user with the ability to specify one or more mathematical functions, and the ability to specify how the numerical data in support of the functions are to be displayed.

In another aspect of the present invention, the graphics calculator or computer includes an input device for receiving at least one mathematical function, a processor for computing the mathematical function, and a tabular display for displaying the results of the computation in a user-definable tabular format.

In yet another aspect of the present invention, a method is provided for generating and displaying numerical data in support of a mathematical function in a calculator or computer. The method includes the steps of receiving at least one mathematical function, computing the numerical values in support of mathematical functions, and displaying the numerical values in an orderly tabular format.

BRIEF DESCRIPTION OF THE DRAWINGS

For a better understanding of the present invention, reference may be made to the accompanying drawings, in which:

FIG. 2 is a partial flowchart illustrating the process of generating a table supporting a mathematical function;

FIG. 3 is a more detailed flowchart illustrating the process of setting up and generating a table;

FIG. 5 is a view of a calculator display for entering a mathematical function;

FIG. 6 is a view of a calculator display of a plot of an exemplary mathematical function;

FIG. 7 is a view of a calculator display for entering table setup parameters and format;

FIG. 8 is a view of a calculator display of a table in support of the exemplary mathematical function with both *Indpnt* and *Depend* parameters selected as Auto;

FIG. 9 is a view of a calculator display of a table in support of the exemplary mathematical function with the *Indpnt* and *Depend* parameters selected as Auto and Ask, respectively;

DETAILED DESCRIPTION OF THE INVENTION

Figure 1:
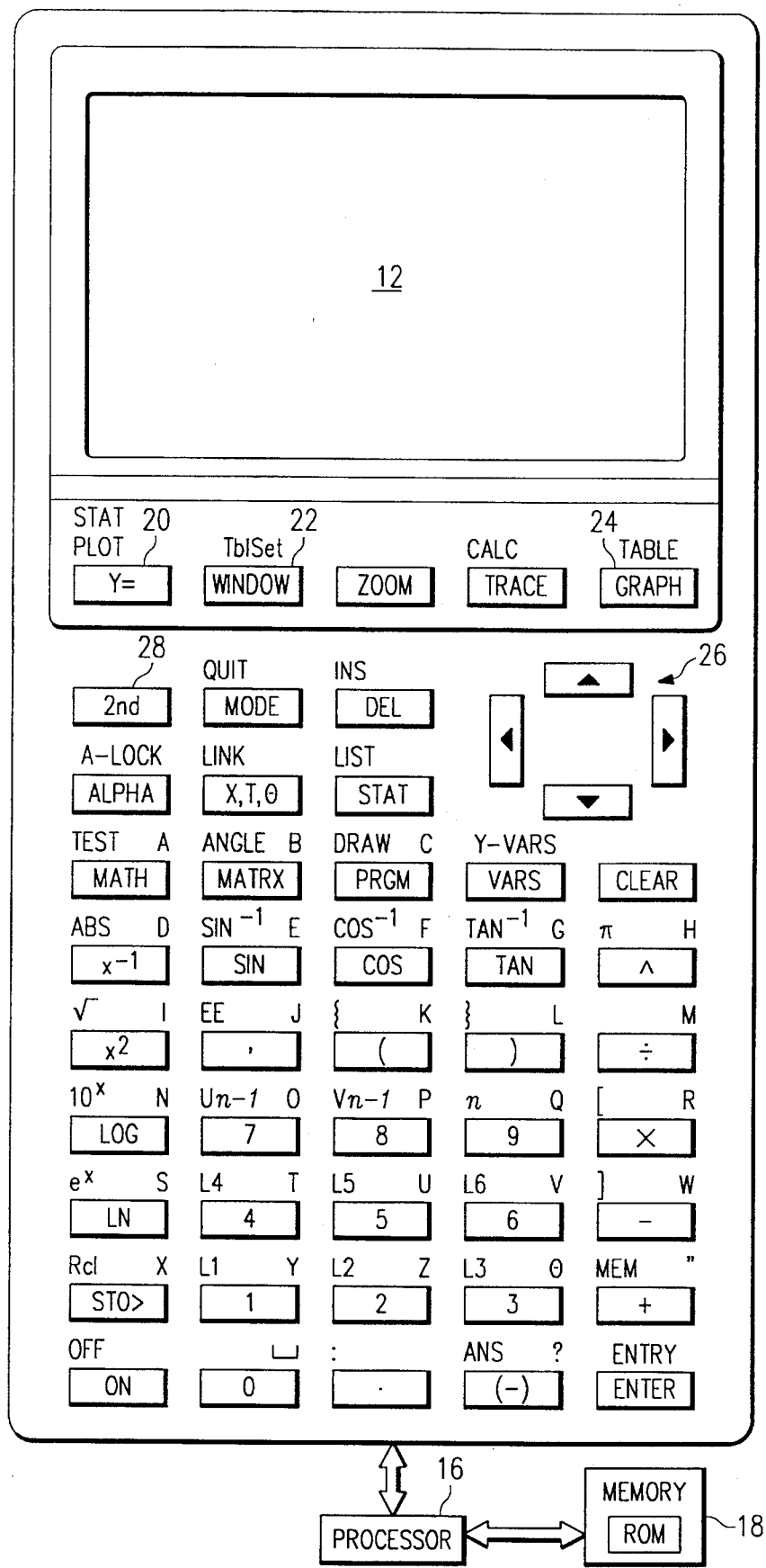
FIG. 1 is an exemplary top view of a graphical calculator having a dedicated program for generating mathematical solutions, graphs, and tabular information.

With reference to the drawings, FIG. 1 shows a top view of a programmable graphics calculator generally indicated at 10. Graphics calculator 10 generally incorporates a graphics display screen 12, which may be implemented with a Liquid Crystal Display (LCD). The dimensions of display screen 12 are selected to ensure clear and adequate presentation of graphics and numerical data.

Graphics calculator 10 also includes an input device 14, such as a key pad shown in FIG. 1. Input device 14 is used for entering data and for prompting graphics calculator 10 to perform certain tasks, such as plotting a graph and displaying a table. Graphics calculator 10 further includes a processor 16 for executing program instructions, receiving data and instructions from input device 14, computing mathematical expressions, and graphing the computed mathematical expression. In addition, graphics calculator 10 includes a memory 18 for storing data and program instructions. Memory 18 may include a Read Only Memory (ROM) or any other suitable storage media such as random access memory (RAM), smart cards, and gate arrays for permanently storing the program instructions.

As shown in FIG. 1, input device 14 incorporates orderly rows and columns of keys dedicated to specific functions. Of special interest to the table generation function are a [Y=] key 20, a [TblSet] key 22, a [TABLE] key 24, and directional arrow keys 26. Of these keys, [TblSet] key 22 and [TABLE] key 24 require the depression of a [2nd] key 28 for their operation. The functions of these keys are described below in context with the processes of generating the tables. Other keys which may be of interest are also briefly described below whenever appropriate.

Referring to FIG. 2, a top level flow chart shows the typical procedure for generating a table of numerical solutions in support of a mathematical expression or graph. Upon prompt or instruction from the user by entering the appropriate keystroke(s), graphics calculator 10 provides a screen display which permits the entry of mathematical functions, as shown in block 32. Such a screen display 130 is shown in FIG. 5, where an exemplary expression, $Y_1=5 \cos X$, has been entered via keyboard inputs. As shown, additional mathematical functions may be entered on subsequent lines. The number of specifiable mathematical expressions is only limited by the capability of calculator 10 and practicality. Once the mathematical function has been entered, the user may choose to see a plot of its graph 140, as shown in FIG. 6, or a table of ordered sets of numerical values for independent variable X and dependent variable $Y_1$, as shown in FIG. 8. Other display options are also available by changing [TblSet] settings.

Memory 18 may store default values for each table setup setting. The user may also first specify the format of the table, as shown in block 34 of FIG. 2. Upon prompt or instruction by entering the appropriate keystroke(s), a Table Setup Menu screen display is provided, such as the one shown in FIG. 7. Screen display 150 shows that the minimum numerical value for the independent variable to be displayed, *Tbl Min*, has been set to −0.5, and the incremental step value for the independent variable, ∆*Tbl*, has been set to 0.5. In addition, each independent variable, represented by *Indpnt*, and the dependent variable, *Depend*, may be set to two modes of operation for a combined four modes of operation. The function of these settings is described more fully below. Once the table format has been set up or the default settings are used, the table may be displayed, as shown in block 36 in FIG. 2, by entering the appropriate keystroke(s).

Figure 4:
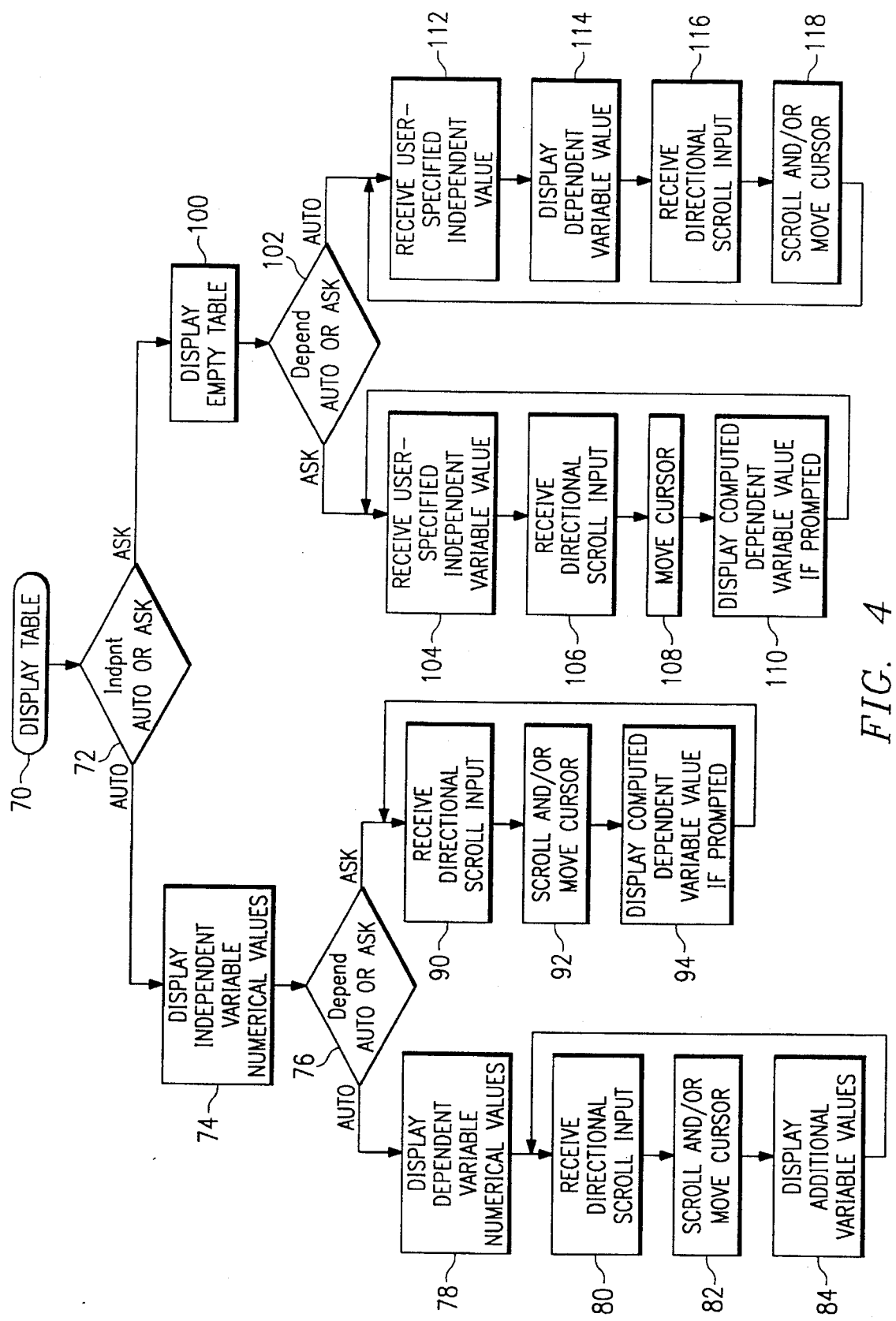
FIG. 4 is a more detailed flowchart illustrating the process of displaying the table.

Referring to FIGS. 3 and 4, more detailed flowcharts illustrating this procedure are shown. Once Graphics calculator 10 is turned on, it waits for user instructions or prompts, as shown in block 40 of FIG. 3. If [Y=] key 20 is depressed, then a mathematical function entry screen 130 such as one shown in FIG. 5 is displayed, as shown in block 42. After the mathematical function has been entered, processor 24 receives the entered mathematical function, as shown in block 44, and returns to block 40 to continue waiting for the next instruction or keystroke(s). The received mathematical function may then be stored in memory 18. After the entry of the mathematical function, the user may choose to view its graph by entering the appropriate keystroke(s), such as [GRAPH] key 24, or the user may choose to view numerical values for the independent and dependent variables in a tabular format using default values or previously set values.

As shown in block 50 of FIG. 3, if the user enters [TblSet] key 22, the table setup menu is displayed on screen 12. Such a screen display 150 is shown in FIG. 7. If the table format is not previously set, the default values for each parameter are shown. The default value for *Tbl Min* may be set to zero; ∆*Tbl* may be set to 1; and both *Indpnt* and *Depend* may be set to Auto. *Indpnt* and *Depend* settings determine whether values for the independent and dependent variables are calculated automatically or at the user's prompt. To change the parameter values, directional arrow keys 26 are used to place the cursor at the appropriate locations, and numbers may be keyed in. Expressions may be similarly entered, which are resolved into numbers when the [ENTER] key is pressed. The Indpnt and Depend settings may be changed by placing the cursor over the desired setting and pressing an [ENTER] key, located at the bottom right hand corner of key pad 14. As shown, *Tbl Min* is changed to −0.5, ∆*Tbl* is changed to 0.5, and *Indpnt* and *Depend* are set to Auto. When the tabular format parameter settings are entered, processor 16 receives the values, as shown in blocks 52–56 in FIG. 3. Execution then returns to block 40 to wait for subsequent user instructions.

The user at this time may choose to view the tabular display by entering [TABLE] key 24. The table listing the numerical values for the independent and dependent variables is displayed, as shown in block 60, and an exemplary screen display is shown in FIG. 8. The table screen 160 is divided into three areas: a heading line 162 where the variable names are displayed, a display area 164 where numerical values are displayed, and an entry/display line 166 located at the bottom of the screen where numerical data may be entered. Equations may also be edited on line 166.

FIG. 8 shows a table display 160 listing the numerical values in support of the function $Y_1=5 \cos X$. As shown, the minimum value displayed for the independent variable X is −0.5, in accordance with the setting on screen display 150 in FIG. 7. The incremental step value between each successive independent variable value is 0.5, also in accordance with the setting on screen display 150. Additionally, the numerical values for both X and $Y_1$ are displayed in accordance with the Auto setting of both *Indpnt* and *Depend* on table setup screen 150.

Referring to the flowchart in FIG. 4, the table generation process 70 is described in more detail. The table display format is dependent on the settings for *Indpnt* and *Depend* parameters in the table setup screen. A determination is made as to whether *Indpnt* is set to Auto, as shown in block 72. If *Indpnt* is Auto, then the independent variable numerical values are automatically calculated and displayed, as shown in block 74. A further determination is made as to whether the Depend parameter is set to Auto or Ask, as shown in block 76. If Depend is set to Auto, the dependent variable values are automatically calculated and displayed, as shown in block 78. Therefore, when both Indpnt and Depend are set to Auto, all numerical values are calculated and displayed in the table automatically.

Aside from the numerical values displayed, the user may, in effect, expand the size of the table and view additional numerical data by moving the cursor and causing the screen to scroll. In FIG. 8, the cursor is located at the first value for X in the table, as shown by the reverse video display. If the user desires to see numerical values where X is less than −0.5, the up arrow may be used to scroll the screen upward. Each time the table scrolls up or down a row, processor 16 computes the new values for the added row. For example, scrolling up one row causes the new row to display a value −1 for X and 2.7015 for $Y_1$ (not shown). The values that were in the bottom row which scrolled off the screen may be lost and not stored in memory 18. Similarly, if the cursor is moved to the bottom of the screen and scrolled down one row, the new row displays a value 3 for X and −4.95 for $Y_1$ (not shown). Therefore, if there is any directional scroll input, as shown in block 80 of FIG. 4, the new scroll input is received by processor 16 and the display is modified to reflect the directional input accordingly, as shown in blocks 82 and 84.

The Ask setting on table setup screen 150 provides the user a chance to specify the independent variable value and anticipate the value for the corresponding dependent variables. For example, if the Auto option for *Indpnt* is selected but the Ask option for *Depend* is selected, as determined in blocks 72 and 76, the resultant table screen display is shown in FIG. 9, where the values for dependent variable $Y_1$ are not displayed. To prompt graphics calculator 10 to provide the value for the $Y_1$, the user may move the cursor to the appropriate $Y_1$ location. Processor 16 receives the directional inputs, as shown in block 90, and the screen is modified accordingly, as shown in block 92. The location of the cursor may be shown by the reverse video display. The user then depresses the [ENTER] key at the appropriate location. The $Y_1$ value is then computed and displayed by processor 16, as shown in block 94.

Figure 10:
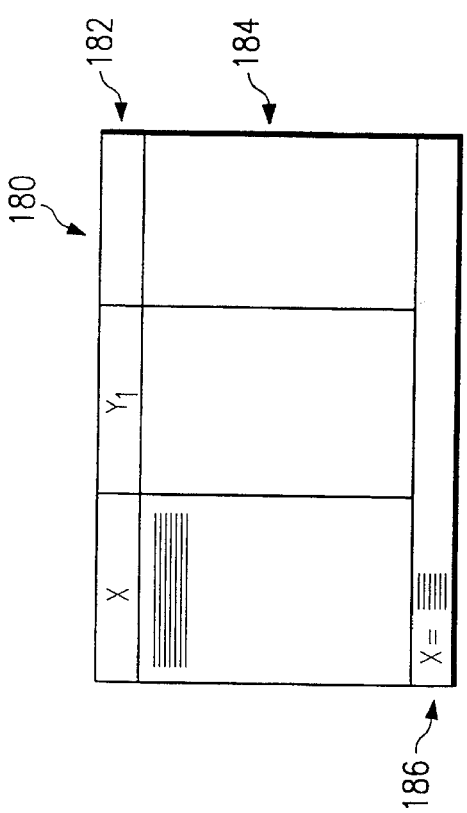
FIG. 10 is a view of a calculator display of a table in support of the exemplary mathematical function with both *Indpnt* and *Depend* parameters selected as Ask.

Similarly, if both *Indpnt* and *Depend* are set to Ask in the table setup menu, as determined in blocks 72 and 102, screen 180 as shown in FIG. 10 is displayed, as shown in block 100. This option provides the user the opportunity to specify each of the independent variable values and corresponding dependent variable values that go in the table. Therefore, the user is free to construct the table using values that are of particular interest to him or her. The user may do so by entering the numerical values at the entry/display line 186 when the cursor is placed at desired locations. In the example depicted in FIG. 10, processor 16 then receives the user-specified independent variable values, as shown in block 104. With this option, the user must still prompt calculator 10 for each corresponding value of the dependent variable. Therefore, processor 16 also receives cursor movement inputs to move the cursor and displays the dependent variable values when appropriately prompted, as shown in blocks 106–110. On the other hand, if *Indpnt* is set to Ask and *Depend* is set to Auto, as determined in blocks 72 and 102, the values for the dependent variables are displayed automatically as soon as the user enters the independent variable values in the entry/display line 186, as shown in blocks 112–118. Note that if the user leaves and returns to the table screen after having entered numbers, the table will still contain values previously entered.

The directional arrow keys 26 may also be used to scroll to the left and right. On the mathematical function entry screen 130 shown in FIG. 5, a total of ten mathematical expressions may be entered although only eight entry lines may be shown at one time. The down arrow key may be used to scroll the screen downward so that additional mathematical expressions may be entered or viewed. Similarly, although table screen 160 (FIG. 8) may display only three columns at one time, it may be "scrolled" to the right to show the ordered sets of numerical values for additional mathematical expressions, with the independent variable column remaining as the leftmost column in the display. For example, if there were three mathematical expressions $Y_1$ to $Y_3$ entered, the initial screen would show the column for the independent variable X, and the columns for dependent variables $Y_1$ and $Y_2$. Scrolling to the right one column would change the screen display to show the X column and $Y_2$ and $Y_3$ columns.

If the user leaves the table screen and returns to it without changing any definition or setting associated with the table, the table will remain unchanged. However, if the user changes the *Tbl Min* value and/or the Auto/Ask settings, for example, the table may be recalculated to reflect the changed setting when the user returns to it.

Figure 12:
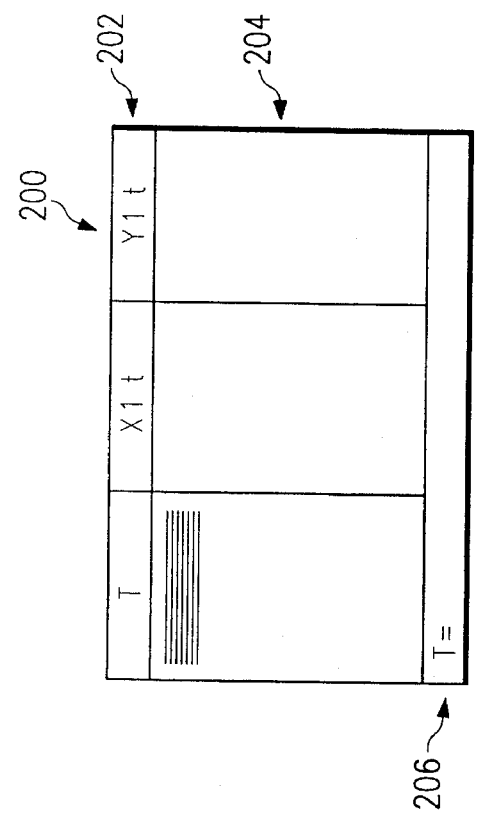
FIG. 12 is a view of a calculator display of a table in support of a parametric function.
Figure 13:
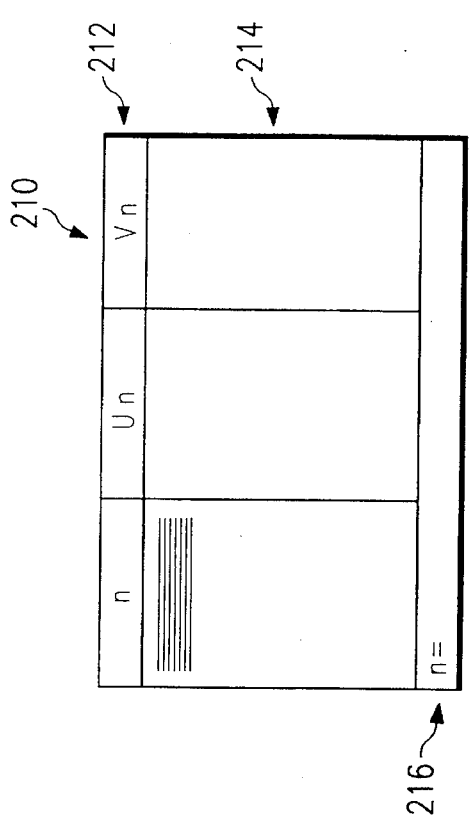
FIG. 13 is a view of a calculator display of a table in support of a numerical sequence.
Figure 11:
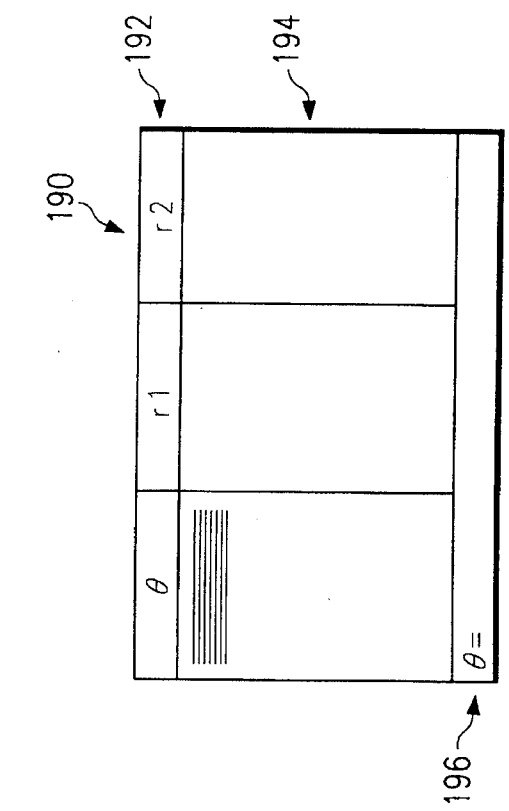
FIG. 11 is a view of a calculator display of a table in support of polar equation.

In addition to supporting rectangular (x,y) functions, graphics calculator 10 also performs other categories of computations. For example, graphics calculator 10 also supports polar, parametric and sequence graphing and generates numerical data in tabular format in support thereof. Referring to the exemplary table screen display 190 of FIG. 11, dependent variables r1 and r2 are functions of independent variable θ, and are shown in tabular format. Referring to FIG. 12, an exemplary table screen display 200 for a parametric equation is shown, where variables X1t and Y1t are dependent on independent variable T. In FIG. 13, an exemplary table screen display 210 shows sequences $U_n$ and $V_n$, where n is the sequence number. The table setup menu for polar, parametric and sequence functions may be similarly defined, as described above.

Although the present invention and its advantages have been described in detail, it should be understood that various changes, substitutions and alterations can be made therein without departing from the spirit and scope of the invention as defined by the appended claims.

What is claimed is:

1. An electronic calculator comprising:
   an input device for inputting a mathematical function having at least one dependent and one independent variable in response to selective actuation by an operator;
   a processor operably connected to said input device for receiving the mathematical function and computing said mathematical function to produce ordered sets of numerical values for each of said dependent and independent variables; and
   display means operably connected to said processor and having a predetermined tabular display format into which said computed ordered sets of numerical values are arranged for visual presentation in a table of vertically disposed entries.

2. The calculator, as set forth in claim 1, wherein said input device has a plurality of keys, and said mathematical function having at least one dependent and one independent variable being input by said input device in response to selective actuation of respective ones of said plurality of keys by the operator; and
   said input device further inputting a minimum numerical value for said independent variable and an incremental step value therefor for display by said display means in response to selective actuation of respective ones of said plurality of keys by the operator.

3. The calculator, as set forth in claim 2, wherein said processor produces a predetermined number of ordered sets of numerical values for display in said predetermined tabular display format by said display means in response to the minimum numerical value and incremental step value for said independent variable as input by said input device.

4. The calculator, as set forth in claim 1, wherein said input device has a plurality of keys which include designated scrolling keys;
   the numerical values as displayed by said display means in said predetermined tabular display format being traversed in a selected direction in response to the actuation of one of said designated scrolling keys.

5. The calculator, as set forth in claim 4, wherein the processor is prompted to compute said mathematical function and produce additional ordered sets of numerical values for display by said display means in response to the actuation of one of said designated scrolling keys causing traversal of all of the numerical values as displayed by said display means in said predetermined tabular display format; and the scrolling of said display means being correlated in relation to the actuation of said one designated scrolling key for displaying said additional ordered sets of numerical values.

6. The calculator, as set forth in claim 1, wherein the processor in response to receiving specific numerical values for said independent variables from the operator via said input device computes corresponding numerical values for said dependent variables; and said display means displaying respective specific numerical values for said independent variables along with the corresponding computed numerical values for said dependent variables in said predetermined tabular display format.

7. A digital computer capable of plotting graphs, said computer comprising:

an input device having a plurality of keys for inputting a mathematical function having at least one dependent and one independent variable in response to selective actuation of said keys by an operator;

a processor operably connected to said input device for receiving the mathematical function and computing said mathematical function to produce ordered sets of numerical values for each of said dependent and independent variables; and display means operably connected to said processor and having a predetermined tabular display format into which said computed ordered sets of numerical values are arranged for visual presentation in a table of vertically disposed entries.

8. The digital computer, as set forth in claim 7, further comprising a memory having table setup parameters stored therein;

the plurality of keys of said input device including a designated table setup menu key;

said display means displaying a table setup menu in response to the actuation of said designated table setup menu key of said input device by the operator;

said table setup menu having a designated entry for a minimum numerical value for said independent variable and a designated entry for an incremental step value for determining a range of display in said predetermined tabular display format; and said input device receiving a minimum numerical value and an incremental step value via selective actuation of said plurality of keys by the operator.

9. The digital computer, as set forth in claim 8, wherein said display means displays numerical values for said independent variable in accordance with the designated entry of said minimum numerical value and said incremental step value in said table setup menu of said memory as accessed by said processor in said tabular display format;

said processor in dependence upon said input device receiving a prompting keystroke sequence from the operator, computes said mathematical function using said received specific numerical values for said independent variables for producing corresponding numerical values for said dependent variables; and said display means displays said computed numerical values for said dependent variables in said predetermined tabular display format.

10. The digital computer, as set forth in claim 7, wherein the plurality of keys of said input device include a designated display table key;

said processor producing a predetermined number of ordered sets of numerical values associated with said mathematical function in response to the actuation of said designated display table key; and said display means displaying said ordered sets of numerical values in said predetermined tabular display format.

11. The digital computer, as set forth in claim 7, wherein the plurality of keys of said input device include a designated scroll up key; and the numerical values as displayed by said display means in said tabular display format being traversed upwardly in response to the actuation of said designated scroll up key.

12. The digital computer, as set forth in claim 11, wherein the processor is prompted to compute said mathematical function and produce additional ordered sets of numerical values for display by said display means in response to the actuation of said designated scroll up key causing traversal of the numerical values beyond those displayed by said display means in said predetermined tabular display format; and said display means being correlated in relation to the actuation of said designated scroll up key for scrolling upward and displaying said additional ordered sets of numerical values.

13. The digital computer, as set forth in claim 7, wherein the plurality of keys of said input device include a designated scroll down key; and the numerical values as displayed by said display means in said tabular display format being traversed downwardly in response to the actuation of said designated scroll down key.

14. The digital computer, as set forth in claim 13, wherein the processor is prompted to compute said mathematical function and produce additional ordered sets of numerical values for display by said display means in response to the actuation of said designated scroll down key causing traversal of the numerical values beyond those displayed by said display means in said predetermined tabular display format; and said display means being correlated in relation to the actuation of said designated scroll down key for scrolling downward and displaying said additional ordered sets of numerical values.

15. The digital computer, as set forth in claim 7, further comprising a memory having table setup parameters stored therein;

the plurality of keys of said input device including a designated table setup menu key;

said display means displaying a table setup menu in response to the actuation of said designated table setup menu key of said input device by the operator;

said table setup menu having a designated entry for selecting an option to user-specify numerical values for said independent variable, said input device further receiving specific numerical values for said independent variables for display by said display means in said predetermined tabular display format;

said processor computing said mathematical function using said specific numerical values as received by said input device for producing corresponding numerical values for said dependent variables; and said display means automatically displaying said numerical values for said dependent variables as produced by said processor in said predetermined tabular display format.

16. The digital computer, as set forth in claim 7, further comprising a memory having a table setup menu stored therein;

the plurality of keys of said input device including a designated table setup menu key;

said display means displaying said table setup menu in response to the actuation of said designated table setup menu key of said input device by the operator;

said table setup menu having a designated entry for selecting an option to user-prompt numerical values for said dependent variable;

said processor in response to said input device receiving a prompting input, computing said mathematical function and producing corresponding numerical values for said dependent variables; and said display means displaying said numerical values for said dependent variables as produced by said processor in said predetermined tabular display format.

17. The digital computer, as set forth in claim 7, further comprising a memory having a table setup menu stored therein;

the plurality of keys of said input device including a designated table setup menu key;

said display means displaying said table setup menu in response to the actuation of said designated table setup menu key of said input device by the operator;

said table setup menu having a designated entry for selecting a first option to user-specify numerical values for said independent variable, and a second option to user-prompt numerical values for said dependent variable;

said input device receiving specific numerical values for said independent variables for display by said display means in said predetermined tabular display format;

said processor in response to said input device receiving a prompting input, computing said mathematical function using said received specific numerical values for producing corresponding numerical values for said dependent variables; and said display means displaying said numerical values for said dependent variables as produced by said processor in said predetermined tabular display format.

18. An electronic calculator comprising:

an input device for inputting a mathematical function having at least one dependent and one independent variable in response to selective actuation by an operator;

memory means operably coupled to said input device for storing data and program instructions;

a processor operably connected to said input device and to said memory means for receiving the mathematical function and computing said mathematical function to produce ordered sets of numerical values for each of said dependent and independent variables;

display means having at least a graphics display mode and a tabular data display mode operably connected to said processor and being controlled thereby, said display means when in the tabular data display mode having a predetermined tabular display format into which said computed ordered sets of numerical values are arranged for visual presentation in a table of vertically disposed entries; and the tabular data display mode of said display means comprising a table arrangement having a plurality of vertical columns into which data entries representative of dependent and independent variables of the mathematical function are to be disposed as parameters of the mathematical function, each of the data entries disposable in the same vertical column being representative of the same parameter of the mathematical function.

* * * * *